(12) United States Patent
Robertson

(10) Patent No.: US 10,018,055 B2
(45) Date of Patent: Jul. 10, 2018

(54) FAN PLATFORM

(71) Applicant: United Technologies Corporation, Hartford, CT (US)

(72) Inventor: Thomas J. Robertson, Glastonbury, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 308 days.

(21) Appl. No.: 14/951,651

(22) Filed: Nov. 25, 2015

(65) Prior Publication Data

US 2016/0076388 A1    Mar. 17, 2016

Related U.S. Application Data

(63) Continuation of application No. PCT/US2014/052921, filed on Aug. 27, 2014.

(Continued)

(51) Int. Cl.
*F01D 5/28*     (2006.01)
*F01D 5/02*     (2006.01)
(Continued)

(52) U.S. Cl.
CPC .............. *F01D 5/282* (2013.01); *F01D 5/02* (2013.01); *F01D 5/147* (2013.01); *F01D 11/008* (2013.01); *F05D 2220/32* (2013.01); *F05D 2220/36* (2013.01); *F05D 2240/30* (2013.01); *F05D 2240/80* (2013.01); *F05D 2300/6034* (2013.01); *F05D 2300/614* (2013.01); *Y02T 50/672* (2013.01)

(58) Field of Classification Search
CPC . F01D 5/282; F01D 5/02; F01D 5/147; F01D 11/008; F05D 2220/36; F05D 2240/80; F05D 2300/6034; F05D 2300/614; Y02T 50/672
See application file for complete search history.

(56) References Cited

U.S. PATENT DOCUMENTS

| | | | |
|---|---|---|---|
| 4,983,451 A * | 1/1991 | Sugino | C04B 35/83 156/148 |
| 5,421,704 A * | 6/1995 | Carletti | F01D 5/282 416/193 A |

(Continued)

OTHER PUBLICATIONS

International Preliminary Report on Patentability dated Mar. 15, 2016 in Application No. PCT/US2014/052921.

(Continued)

*Primary Examiner* — Igor Kershteyn
*Assistant Examiner* — Eric Zamora Alvarez
(74) *Attorney, Agent, or Firm* — Snell & Wilmer, L.L.P.

(57) ABSTRACT

A fan platform section may include a flow path portion with a plurality of composite plies. A first composite ply in the plurality of composite plies may include directional fibers. The directional fibers may be configured to prevent twisting of the flow path section in response to a centripetal load. The fan platform section may include a second composite ply in the plurality of composite plies. The second composite ply may include directional fibers. The directional fibers in the first composite ply may be orthogonal with respect to the directional fibers in the second composite ply.

16 Claims, 8 Drawing Sheets

Related U.S. Application Data

(60) Provisional application No. 61/877,463, filed on Sep. 13, 2013.

(51) Int. Cl.
   *F01D 5/14*       (2006.01)
   *F01D 11/00*      (2006.01)

(56) References Cited

U.S. PATENT DOCUMENTS

| | | |
|---|---|---|
| 6,217,283 B1 | 4/2001 | Ravenhall et al. |
| 6,481,971 B1 * | 11/2002 | Forrester ................. F01D 5/323 |
| | | 416/220 R |
| 7,306,826 B2 | 12/2007 | Subramanian et al. |
| 2012/0301317 A1 | 11/2012 | Alvanos |
| 2013/0084189 A1 * | 4/2013 | Diego ................... C04B 37/001 |
| | | 416/241 B |

OTHER PUBLICATIONS

International Search Report and Written Opinion dated May 14, 2015 in Application No. PCT/US2014/052921.

* cited by examiner

FAN PLATFORM

CROSS-REFERENCE TO RELATED APPLICATIONS

This application is a continuation of, claims priority to and the benefit of, PCT/US2014/052921 filed on Aug. 27, 2014 and entitled "FAN PLATFORM," which claims priority from U.S. Provisional Application No. 61/877,463 filed on Sep. 13, 2013 and entitled "FAN PLATFORM." Both of the aforementioned applications are incorporated herein by reference in their entirety.

FIELD OF INVENTION

The present disclosure relates generally to turbine engines, and more particularly, to fan platforms for turbine engines.

BACKGROUND OF THE INVENTION

A turbofan engine, such as those used in modern aircraft, typically includes a fan, a compressor, a combustion section, and a turbine. The fan may comprise a plurality of fan blades coupled to a hub. The fan may comprise a plurality of fan platform sections coupled to the hub and located between adjacent fan blades. As the fan rotates at high angular velocities, the platform sections may experience significant centripetal loading. The centripetal loading may cause the platform sections to twist or warp and may reduce the efficiency of the fan.

SUMMARY OF THE INVENTION

A fan platform section is disclosed. The fan platform section may comprise a flow path portion comprising a plurality of composite plies. A first composite ply in the plurality of composite plies may comprise directional fibers. A second composite ply in the plurality of composite plies may comprise directional fibers. A center of gravity of the flow path portion may be offset from a pin. The directional fibers in the first composite ply may be orthogonal with respect to the directional fibers in the second composite ply. The directional fibers may be configured to prevent twisting of the flow path portion in response to a centripetal load.

A fan platform section is disclosed. The fan platform section may comprise a flow path portion, at least one lug coupled to the flow path portion, and a pin. The at least one lug may comprise at least one guide hole, and the pin may be located within the at least one guide hole. The flow path portion may comprise a first composite ply. The first composite ply may comprise directional fibers positioned at an angle relative to the pin. The directional fibers may be configured to decrease twisting of the flow path portion.

A system is disclosed. The system may comprise a turbine, a shaft, a hub, a fan blade, and a fan platform section. The turbine may be coupled to an aft end of the shaft. The hub may be coupled to a forward end of the shaft. The fan blade may be coupled to the hub. The fan platform section may be coupled to the hub. The fan platform section may comprise a first composite ply and a second composite ply. The first composite ply may be substantially isotropic, and the second composite ply may be orthotropic. The fan platform section may further comprise a third composite ply, wherein the third composite ply is orthotropic. The second composite ply and the third composite ply may be configured to decrease twisting of the fan platform section in response to centripetal loading.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
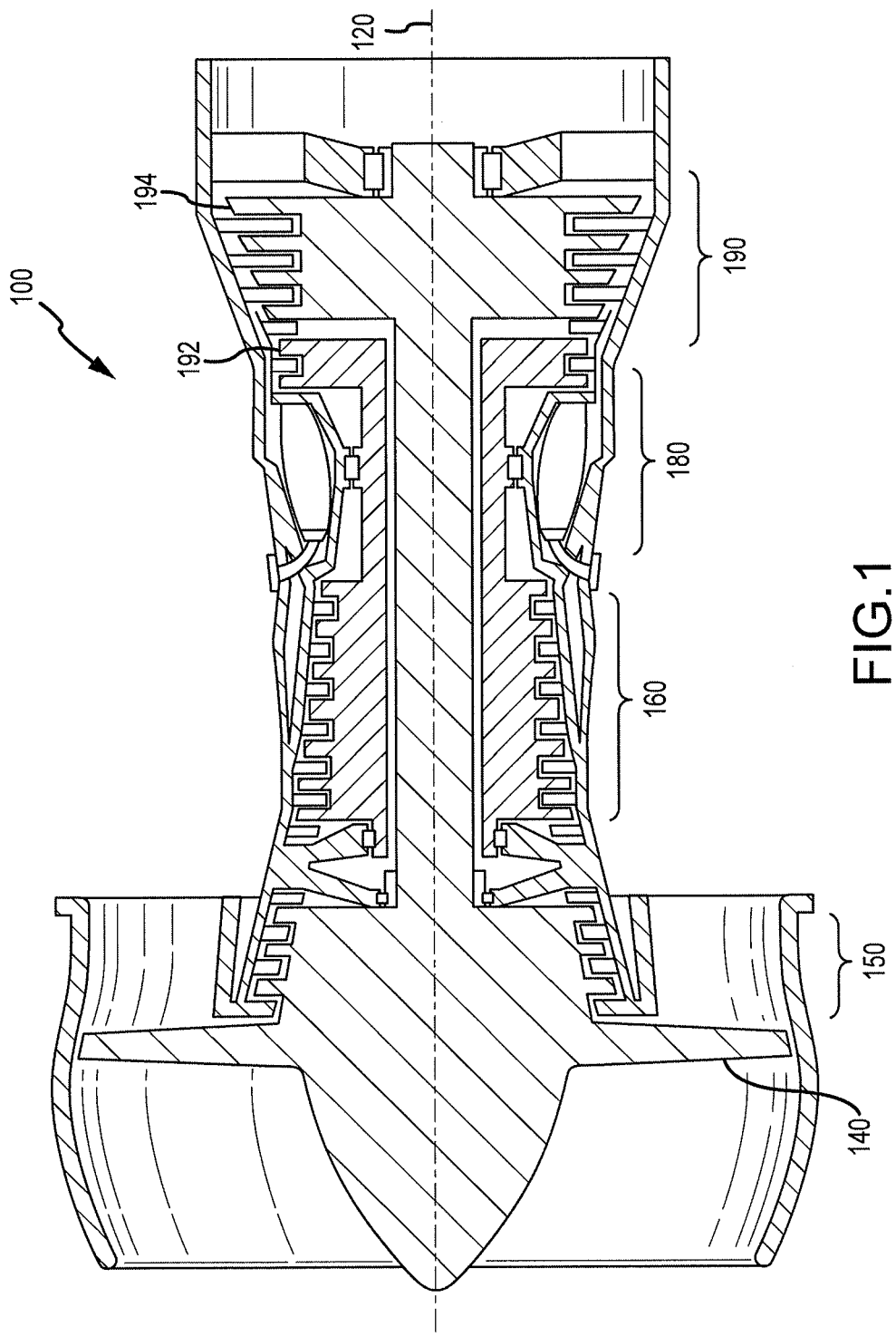
FIG. 1 illustrates a schematic axial cross-section view of a gas turbine engine according to various embodiments.

Referring to FIG. 1, a gas turbine engine 100 (such as a turbofan engine) is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and a turbine section 190. Air compressed in the compressor sections 150, 160 may be mixed with fuel and burned in combustion section 180 and expanded across turbine section 190. Turbine section 190 may include high pressure rotors 192 and low pressure rotors 194, which rotate in response to the expansion of exhaust gases. Low pressure rotors 194 may be coupled to fan 140 via a shaft, causing fan 140 to rotate. FIG. 1 provides a general understanding of the sections in a gas turbine engine, and is not intended to limit the disclosure.

The forward-aft positions of engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
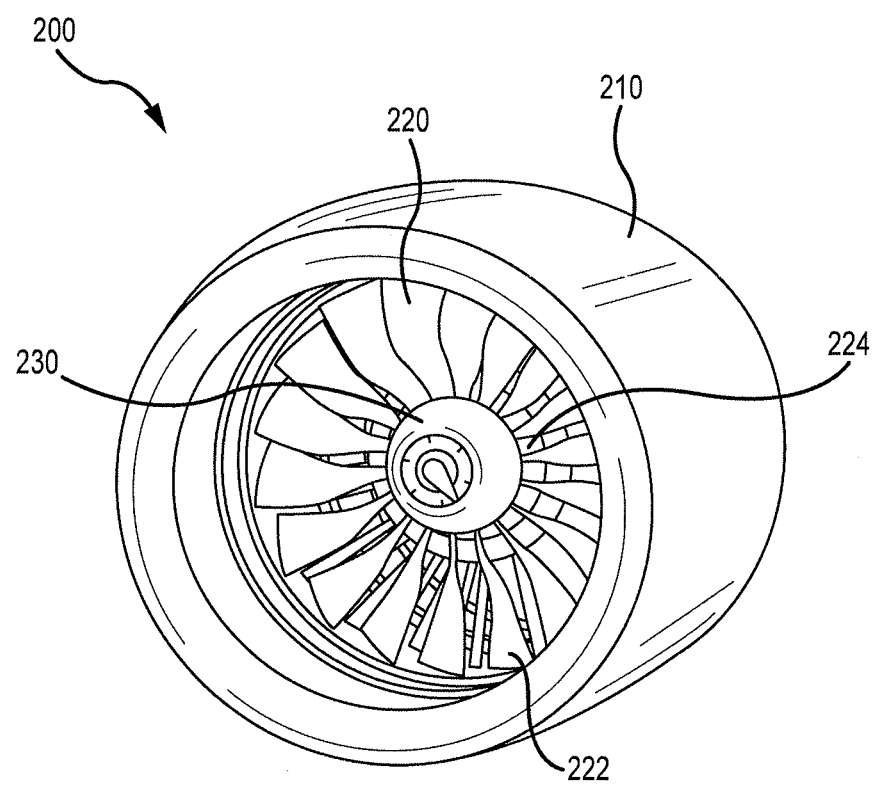
FIG. 2 illustrates a perspective view of a front portion of a gas turbine engine according to various embodiments.

Referring to FIG. 2, a perspective view of a front portion of a gas turbine engine 200 is illustrated according to various embodiments. Gas turbine engine 200 may comprise nacelle 210, fan 220, and spinner nose cone 230. Fan 220 may comprise fan blades 222 and fan platform sections 224. In various embodiments, fan 220 may comprise one fan blade 222 corresponding to each fan platform section 224. For example, in the illustrated embodiment, fan 220 comprises eighteen fan blades 222 and eighteen fan platform sections 224. Fan blades 222 may be mounted to a hub located radially inward of fan platform sections 224, and the hub may be coupled to a forward end of the shaft. Fan platform sections 224 may be mounted to the hub and located between fan blades 222. The edges of platform sections 224 may provide a seal with fan blades 222 to create an inner flow path for air travelling through fan 240.

Figure 3:
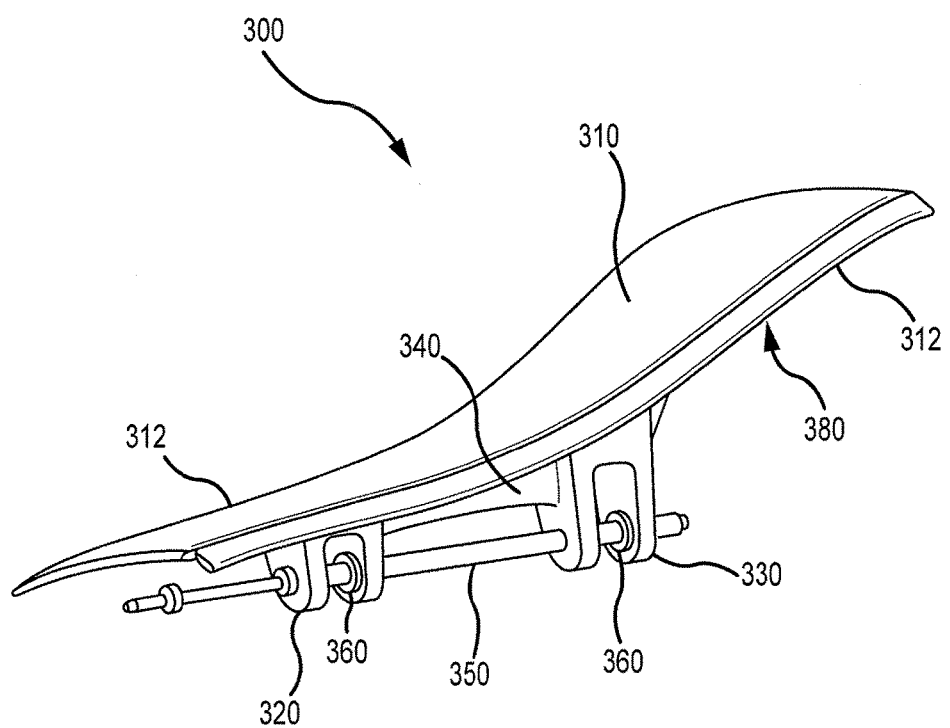
FIG. 3 illustrates a perspective view of a fan platform section according to various embodiments.

Referring to FIG. 3, a fan platform section 300 is illustrated according to various embodiments. Fan platform section 300 may comprise flow path portion 310, forward lug 320, aft lug 330, gusset 340, and pin 350. Flow path portion 310 may define an inner flow path for air travelling through a fan. Flow path edges 312 may form a seal with adjacent fan blades. Forward lug 320 and aft lug 330 may be coupled to an inner surface 380 of flow path portion 310. Gusset 340 may be coupled to inner surface 380 and coupled to and located between forward lug 320 and aft lug 330. Gusset 340 may provide additional stiffness to flow path portion 310 to prevent warping of flow path portion 310. A single gusset 340 is illustrated in FIG. 3. However, in various embodiments, fan platform section may comprise a plurality of gussets to provide stiffness to flow path portion 310. Forward lug 320 and aft lug 330 may be configured to mate with tabs on a fan hub. Guide holes 360 may be located in forward lug 320 and aft lug 330, and may align with guide holes in the fan hub. Pin 350 may be inserted through guide holes 360 in forward lug 320 and aft lug 330 and the guide holes in the fan hub, thus coupling fan platform section 300 to the fan hub. Fan platform section 300 may be free to rotate about pin 350. However, once installed between fan blades, adjacent fan blades may prevent rotation of fan platform section 300.

Figure 4:
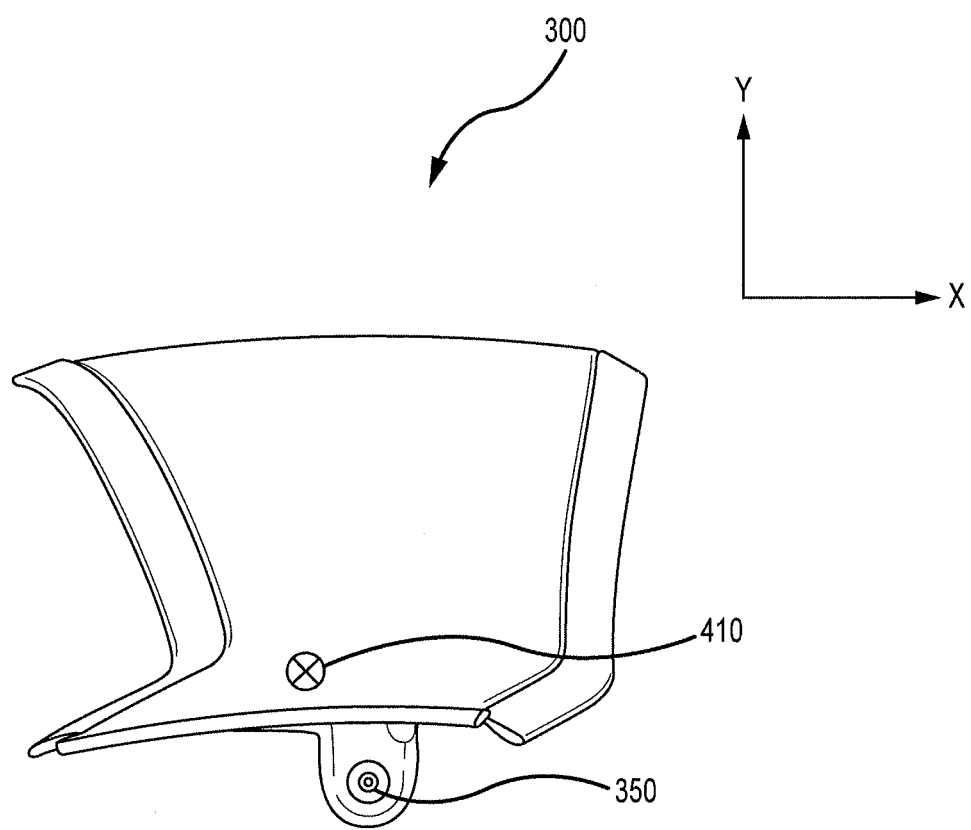
FIG. 4 illustrates a front view of a fan platform section according to various embodiments.

Referring to FIG. 4, a front view of fan platform section 300 is illustrated according to various embodiments along with x and y axes for reference. In various embodiments, fan platform section 300 may comprise a T-shape, wherein forward lug 320 and aft lug 330 (not shown) comprise the leg of the T, and flow path portion 310 comprises the top of the T. In various embodiments, a center of gravity 410 of flow path portion 310 may be offset from pin 350. For example, in the illustrated embodiment, center of gravity 410 is offset in the negative x-direction from pin 350.

Figure 5:
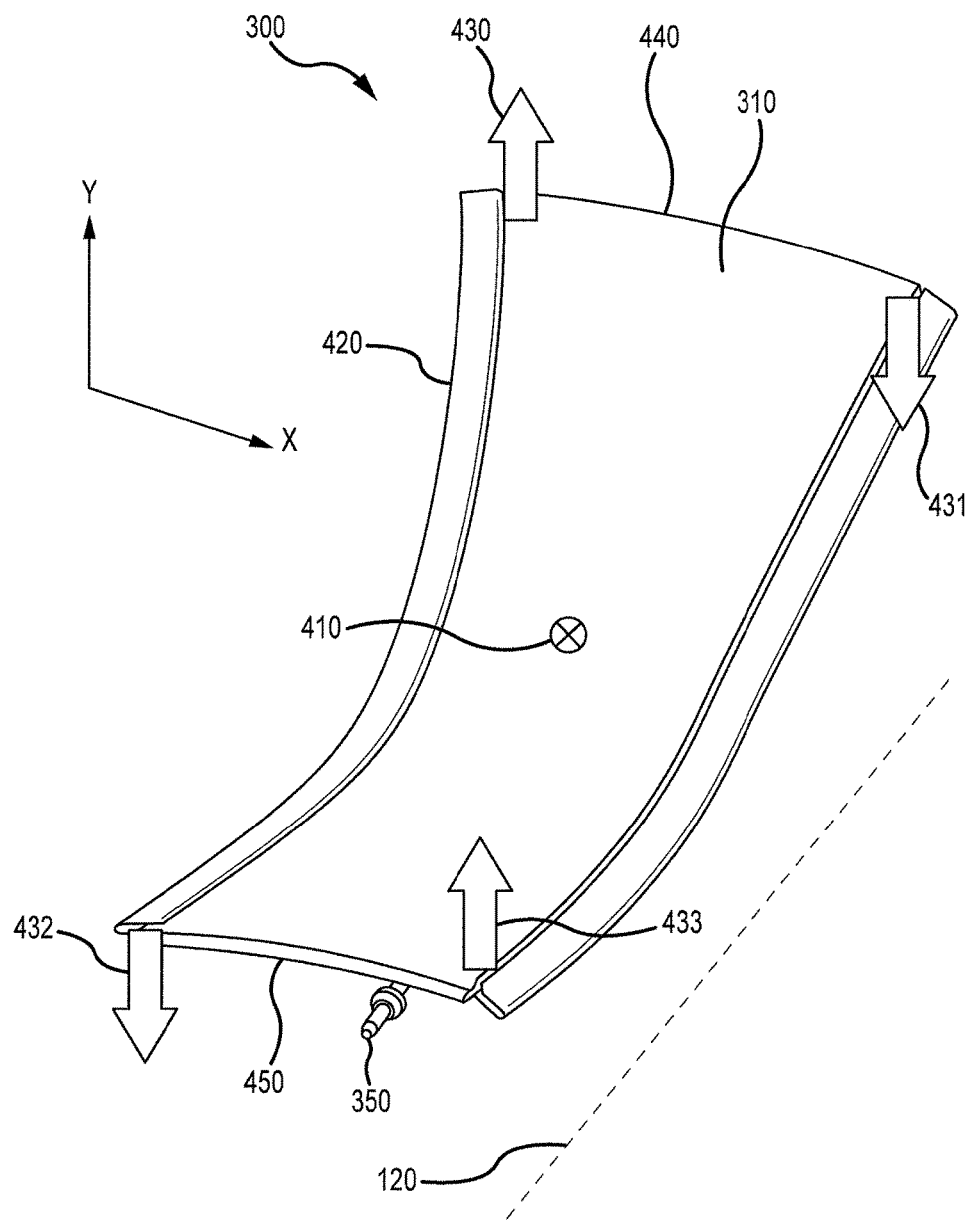
FIG. 5 illustrates a perspective view of a fan platform section under a centripetal load according to various embodiments.

Referring to FIG. 5, a perspective view of fan platform section 300 under a centripetal load is illustrated according to various embodiments along with x and y axes for reference. As described with respect to FIG. 4, center of gravity 410 may be offset from pin 350. As the fan rotates, a centripetal load may be applied to fan platform section 300. Due to the offset center of gravity 410, a torque may be applied to flow path portion 310 about pin 350. The torque may cause twisting and/or warping of flow path portion 310. Additionally, the centripetal loading may be greater at larger radii from axis of rotation 120. Thus, in various embodiments, the torque on flow path portion 310 may be greatest at a portion of flow path portion 310 which is on the same side of pin 350 as center of gravity 410, and which is at a greatest distance from axis of rotation 120. For example, in FIG. 5 center of gravity 410 is offset from pin 350 in the direction of flow path edge 420, and a distance between flow path portion 310 and axis of rotation 120 is greatest at aft edge 440 of flow path portion 310. Thus, the torque on flow path portion 310 may be greatest at aft edge 440 and on the same side of pin 350 as center of gravity 410. As the torque at aft edge 440 on the same side of pin 350 as center of gravity 410 is greater than the torque at aft edge 440 on the opposite side of pin 350 as center of gravity 410, the torque may cause flow path portion 310 to twist as shown by arrows 430 and 431. Flow path portion 310 may twist up until the point where the resistance to deformation of flow path portion 310 counteracts the torque being applied.

Referring still to FIG. 5 and briefly to FIG. 3, forward lug 320, aft lug 330, and gusset 340 may act as a fulcrum for flow path portion 310. Thus, as aft edge 440 on the same side of pin 350 as center of gravity 410 twists in the y-direction as shown by arrow 430, aft edge 440 on the opposite side of pin 350 as center of gravity 410 may twist in the negative y-direction as shown by arrow 431, and forward edge 450 on the same side of pin 350 as center of gravity 410 may twist in the negative y-direction as shown by arrow 432. Similarly, the twisting of flow path portion 310 at arrows 431 and 432 may cause forward edge 450 on the opposite side of center of pin 350 as center of gravity 410 to twist in the positive y-direction as shown by arrow 433.

In various embodiments, additional gussets may be coupled to fan platform section 300 to prevent twisting of fan platform section 300. However, in various embodiments, the geometry of fan platform section 300 and surrounding components, such as the hub and fan blades, may not allow for additional gussets.

Figure 6:
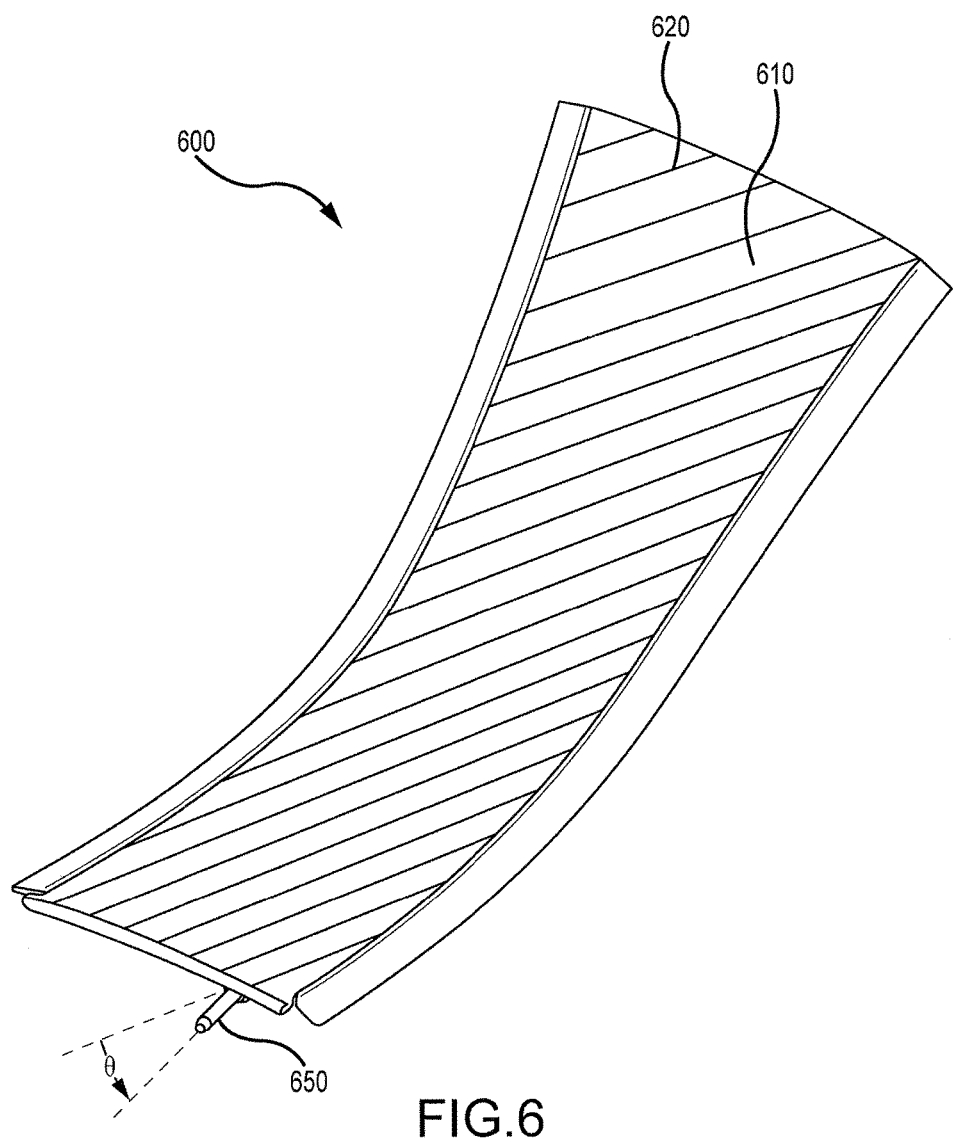
FIG. 6 illustrates a fan platform section with directional fibers according to various embodiments.

Referring to FIG. 6, a fan platform section 600 with directional fibers is illustrated according to various embodiments. In various embodiments, flow path portion 610 of fan platform section 600 may comprise a plurality of co-molded composite plies. In various embodiments, the composite plies may comprise a carbon composite, such as HEXMC, a carbon composite with long fibers and a low resin content, which is manufactured by HEXCEL. However, in various embodiments, the composite plies may comprise KEVLAR (para-aramid fiber) or fiberglass fabrics, and the resin may comprise a thermoplastic resin or an epoxy resin. In various embodiments, the composite plies may comprise any material capable of being formed with directional fibers.

In various embodiments, at least one of the composite plies may be substantially isotropic. In a substantially isotropic ply, the fibers may not be preferentially aligned in any direction. For example, carbon fibers may be randomly aligned within the composite ply. Thus, a resistance to deformation of the composite ply in one direction may be equal to a resistance to deformation in any other direction. However, in various embodiments, at least one ply may comprise directional fibers. In plies with directional fibers, the co-molded composite may be orthotropic, such that a resistance to deformation in a first direction may be different than a resistance to deformation in a second direction.

Fan platform section 600 may comprise at least one composite ply with unbalanced directional fibers 620. In a composite ply with unbalanced directional fibers, the composite ply may comprise a single angle of alignment. In various embodiments, a portion of the fibers may be aligned along the angle of alignment, and a portion of the fibers may be isotropically positioned. However, the angle of alignment may be the only angle along which the fibers are disproportionally aligned. In various embodiments, directional fibers 620 may be aligned at an angle of alignment θ relative to pin 650. In various embodiments, θ may be equal to 30°. However, in various embodiments, θ may be any angle, such as 1° to 89°. In various embodiments, angle θ may be selected such that directional fibers 620 provide additional stiffness to flow path portion 610 which prevent twisting of flow path portion 610 due to centripetal loading. In various embodiments, unbalanced directional fibers may be desired in situations where the twisting from centripetal loading is constant. Directional fibers 620 may provide a stiffness of fan platform section 600 in the direction of directional fibers 620 which is greater than a stiffness in other directions, such as perpendicular to directional fibers 620.

Figure 7:
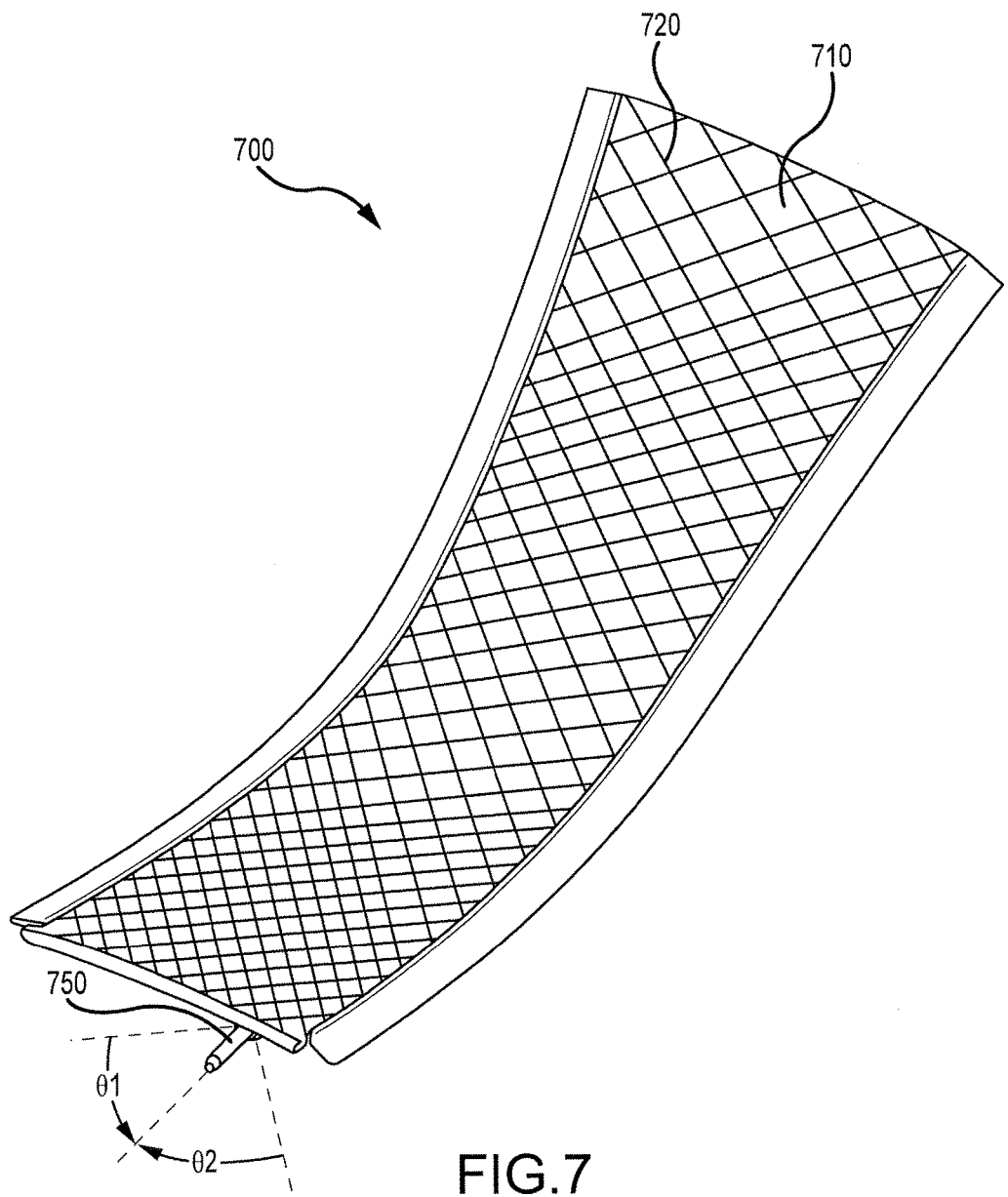
FIG. 7 illustrates a double biased fan platform section according to various embodiments.

Referring to FIG. 7, a fan platform section 700 with a double biased flow path portion is illustrated according to various embodiments. In various embodiments, fan platform section 700 may comprise a double biased flow path portion 710. Double biased flow path portion 710 may comprise two angles of alignment. In various embodiments, a double biased flow path portion may be formed with a first unbalanced composite ply comprising a first angle of alignment, and a second unbalanced composite ply comprising a second angle of alignment different than the first angle of alignment. The first unbalanced composite ply may provide stiffness to fan platform section 700 in the direction of the first angle of alignment, and the second unbalanced composite ply may provide stiffness to fan platform section 700 along the second angle of alignment. In various embodiments, the first angle of alignment may be orthogonal to the second angle of alignment, such that double biased flow path portion is balanced. However, in various embodiments, composite plies may be used with any number of angles of alignment.

As illustrated in FIG. 7, fan platform section 700 comprises a first angle of alignment θ1 equal to 45° relative to pin 750, and a second angle of alignment θ2 equal to negative 45° relative to pin 750. However, in various embodiments θ1 and θ2 may be equal to any angle from negative 90° to 90° relative to pin 750. θ1 and θ2 may be selected such that directional fibers 720 are configured to prevent twisting of flow path portion in response to centripetal loading.

Figure 8:
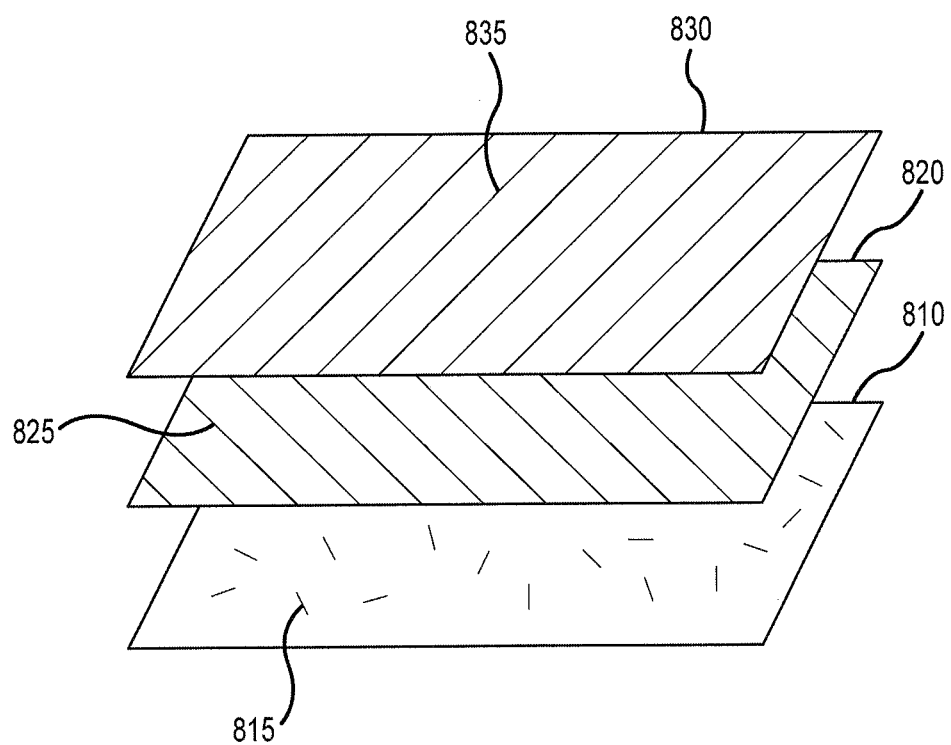
FIG. 8 illustrates a plurality of layers used to form a fan platform section according to various embodiments.

Referring to FIG. 8, a plurality of layers used to form a flow path portion are illustrated according to various embodiments. A first layer 810 may comprise a composite ply and may be substantially isotropic, such that fibers 815 are positioned at random angles and not disproportionally aligned in any particular angle. In various embodiments, first layer 810 may comprise randomly distributed material, such as sheet or bulk molding compound in place of a substantially isotropic ply. A second layer 820 may comprise a composite ply and may comprise directional fibers 825 aligned at a first angle. A third layer may 830 may comprise a composite ply and may comprise directional fibers 835 aligned at a second angle. In various embodiments, directional fibers 825 may be orthogonal to directional fibers 835. Any number of additional composite plies may be used to form a flow path portion. For example, in various embodiments, the flow path portion may comprise any number of composite plies comprising directional fibers in order to prevent twisting of the flow path portion. Additionally, the flow path portion may comprise any number of substantially isotropic composite plies and/or any number of layers of randomly distributed material.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A fan platform section comprising:
   a flow path portion comprising a plurality of composite plies,
   wherein a first composite ply in the plurality of composite plies comprises substantially isotropic directional fibers, wherein a second composite ply in the plurality of composite plies comprises directional fibers orthotropic with respect to the first composite ply, wherein a third composite ply in the plurality of composite plies comprises directional fibers orthotropic with respect to the second composite ply, wherein the second composite ply is disposed between the first composite ply and the third composite ply.

2. The fan platform section of claim 1, wherein the fan platform section comprises a T-shape.

3. The fan platform section of claim 1, wherein the first composite ply comprises an unbalanced composite ply.

4. The fan platform section of claim 3, wherein the unbalanced composite ply comprises a first stiffness in a direction aligned with the directional fibers, and a second stiffness in a direction perpendicular to the directional fibers, wherein the first stiffness is greater than the second stiffness.

5. The fan platform section of claim 1, further comprising at least one lug coupled to the flow path portion, and a pin located within guide holes in the at least one lug.

6. The fan platform section of claim 5, wherein a center of gravity of the flow path portion is offset from the pin.

7. The fan platform section of claim 1, wherein the directional fibers in the first composite ply provide increased stiffness to the fan platform section in a first direction compared to a stiffness in a second direction perpendicular to the first direction, and wherein the directional fibers in the second composite ply provide increased stiffness to the fan platform section in a third direction compared to a stiffness in a fourth direction perpendicular to the third direction.

8. The fan platform section of claim 1, wherein the first composite ply comprises a carbon composite.

9. The fan platform section of claim 1, further comprising a plurality of substantially isotropic composite plies comprising directional fibers in the plurality of composite plies, wherein the fibers in the isotropic plies are aligned in a plurality of directions.

10. A fan platform section comprising:
    a flow path portion;
    a plurality of lugs coupled to the flow path portion, wherein at least one lug comprises a guide hole;
    a pin located within the guide hole, wherein the flow path portion comprises a first composite ply, wherein the first composite ply comprises directional fibers positioned at an angle relative to the pin;
    wherein the flow path portion comprises a second composite ply and a third composite ply, wherein the second composite ply comprises directional fibers orthotropic with respect to the first composite ply, wherein the third composite ply comprises directional fibers orthotropic with respect to the second composite ply, wherein the second composite ply is disposed between the first composite ply and the third composite ply.

11. The fan platform section of claim 10, wherein the directional fibers are configured to decrease twisting of the flow path portion.

12. The fan platform section of claim 10, wherein the directional fibers in the second composite ply are positioned at an angle relative to the directional fibers in the first composite ply.

13. The fan platform section of claim 10, wherein the first composite ply is unbalanced.

14. A system comprising:
    a turbine coupled to an aft end of a shaft;
    a hub coupled to a forward end of the shaft;
    a fan blade coupled to the hub; and
    a fan platform section coupled to the hub, wherein the fan platform section comprises:
      a first composite ply comprising directional fibers, a second composite ply comprising directional fibers, and a third composite ply comprising directional fibers, wherein the first composite ply is substantially isotropic, wherein the second composite ply is orthotropic with respect to the first composite ply, wherein the third composite ply is orthotropic with respect to the second composite ply, wherein the second composite ply is disposed between the first composite ply and the third composite ply.

15. The system of claim 14, wherein the second composite ply and the third composite ply are configured to decrease twisting of the fan platform section in response to centripetal loading.

16. The system of claim 14, wherein the system is a portion of a gas turbine engine.

* * * * *